US010325600B2

(12) United States Patent
Mann et al.

(10) Patent No.: US 10,325,600 B2
(45) Date of Patent: Jun. 18, 2019

(54) LOCATING INDIVIDUALS USING MICROPHONE ARRAYS AND VOICE PATTERN MATCHING

(71) Applicant: HEWLETT-PACKARD DEVELOPMENT COMPANY, L.P., Houston, TX (US)

(72) Inventors: James M Mann, Houston, TX (US); Harold Merkel, Houston, TX (US); Silas Morris, Houston, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 15/539,878

(22) PCT Filed: Mar. 27, 2015

(86) PCT No.: PCT/US2015/023106
§ 371 (c)(1),
(2) Date: Jun. 26, 2017

(87) PCT Pub. No.: WO2016/159938
PCT Pub. Date: Oct. 6, 2016

(65) Prior Publication Data
US 2018/0005632 A1 Jan. 4, 2018

(51) Int. Cl.
H04R 1/32 (2006.01)
G10L 17/00 (2013.01)
(Continued)

(52) U.S. Cl.
CPC ............ G10L 17/005 (2013.01); G10L 17/26 (2013.01); H04R 1/32 (2013.01); H04R 1/40 (2013.01);
(Continued)

(58) Field of Classification Search
CPC . H04R 1/32; H04R 1/326; H04R 1/40; H04R 1/406; G10L 25/00; G10L 25/48;
(Continued)

(56) References Cited

U.S. PATENT DOCUMENTS 8,265,341 B2 9/2012 Dernis et al.
9,197,974 B1* 11/2015 Clark ...................... H04M 9/08
(Continued)

FOREIGN PATENT DOCUMENTS

JP 2008-042260 A 2/2008
WO WO-2014143060 9/2014

OTHER PUBLICATIONS

Bernardin, K. et al.; "Audio-visual Multi-person Tracking and Identification for Smart Environmente"; Sep. 23-28, 2007; 10 pages.

Primary Examiner — Paras D Shah
(74) Attorney, Agent, or Firm — HPI Patent Department

(57) ABSTRACT

Examples disclosed herein provide the ability to identify the location of an individual within a room by using a combination of microphone arrays and voice pattern matching. In one example, a computing device may extract a voice detected by microphones of a microphone array located in a room, perform voice pattern matching to identify an individual associated with the extracted voice, and determine a location of the individual in the room based on an intensity of the voice detected individually by the microphones of the microphone array.

13 Claims, 3 Drawing Sheets

(51) Int. Cl.
  *G10L 17/26* (2013.01)
  *H04R 1/40* (2006.01)
  *H04R 27/00* (2006.01)
  *H04R 29/00* (2006.01)

(52) U.S. Cl.
  CPC ........... *H04R 27/00* (2013.01); *H04R 29/005* (2013.01); *H04R 2430/20* (2013.01)

(58) Field of Classification Search
  CPC ....... G10L 17/00; G10L 17/005; G10L 17/26; G10L 21/00; G10L 21/034
  See application file for complete search history.

(56) References Cited

U.S. PATENT DOCUMENTS

| | | | |
|---|---|---|---|
| 9,226,090 B1* | 12/2015 | Norris | H04M 1/72572 |
| 2002/0090094 A1* | 7/2002 | Amir | H04R 3/00 |
| | | | 381/92 |
| 2004/0013252 A1* | 1/2004 | Craner | H04M 1/247 |
| | | | 379/142.01 |
| 2004/0195854 A1* | 10/2004 | Streit | B60R 11/0217 |
| | | | 296/1.07 |
| 2006/0093161 A1* | 5/2006 | Falcon | H03G 3/3026 |
| | | | 381/104 |
| 2008/0101576 A1 | 5/2008 | Vernick | |
| 2008/0154613 A1* | 6/2008 | Haulick | B60R 25/257 |
| | | | 704/275 |
| 2009/0055180 A1* | 2/2009 | Coon | B60R 16/0373 |
| | | | 704/251 |
| 2010/0085415 A1 | 4/2010 | Rahman | |
| 2010/0123770 A1 | 5/2010 | Friel et al. | |
| 2011/0044481 A1* | 2/2011 | Marquis | H04R 25/405 |
| | | | 381/313 |
| 2012/0206553 A1* | 8/2012 | MacDonald | H04M 1/2535 |
| | | | 348/14.01 |
| 2012/0252422 A1 | 10/2012 | Gupta | |
| 2012/0254382 A1 | 10/2012 | Watson et al. | |
| 2013/0028443 A1 | 1/2013 | Pance et al. | |
| 2014/0219471 A1* | 8/2014 | Deshpande | H04R 3/005 |
| | | | 381/92 |
| 2014/0270248 A1* | 9/2014 | Ivanov | H04R 3/005 |
| | | | 381/92 |
| 2014/0294196 A1* | 10/2014 | An | H04R 3/005 |
| | | | 381/92 |
| 2015/0181328 A1* | 6/2015 | Gupta | H04R 3/005 |
| | | | 381/56 |
| 2015/0195489 A1* | 7/2015 | Sobti | H04N 7/142 |
| | | | 348/14.08 |
| 2016/0071526 A1* | 3/2016 | Wingate | G10L 21/028 |
| | | | 704/233 |
| 2016/0173976 A1* | 6/2016 | Podhradsky | H04R 3/005 |
| | | | 381/92 |

\* cited by examiner

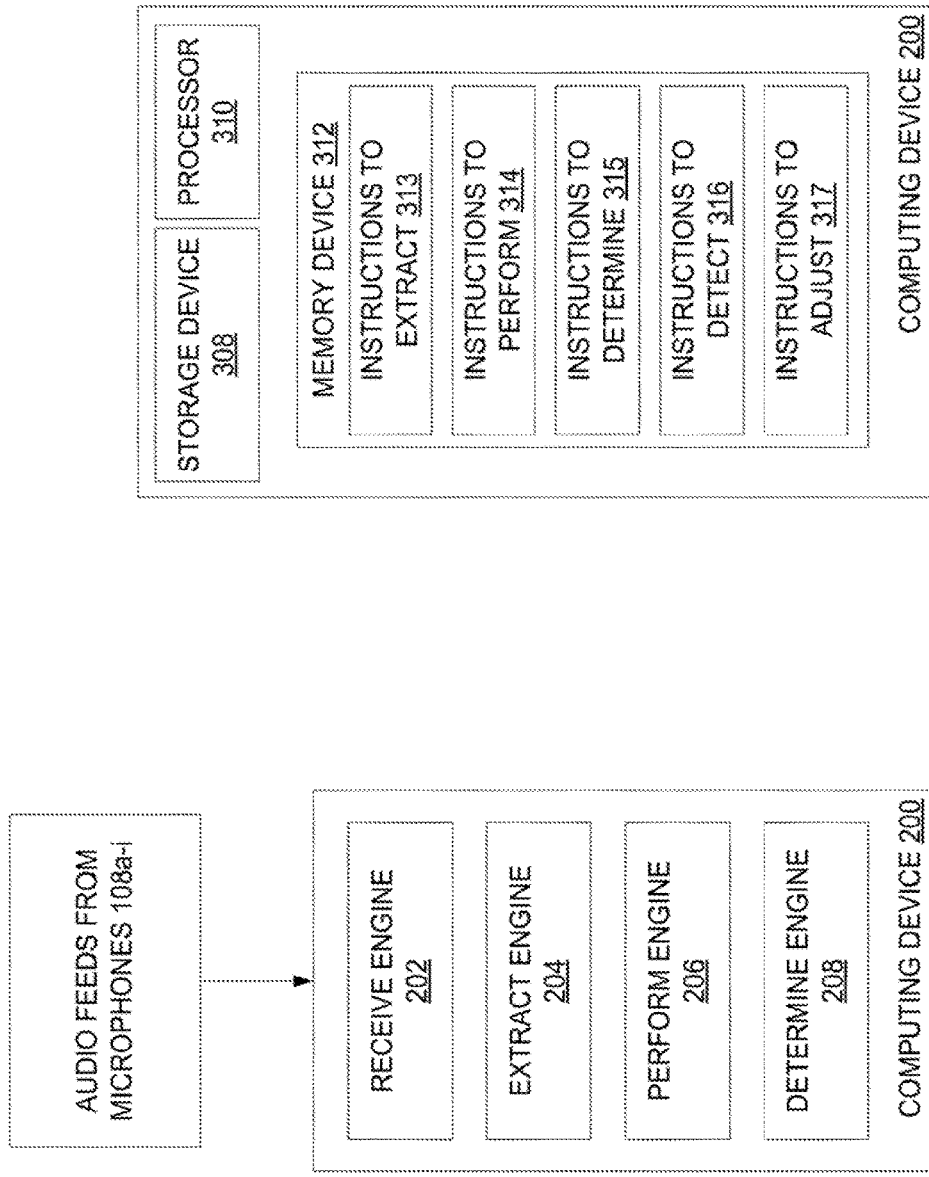

LOCATING INDIVIDUALS USING MICROPHONE ARRAYS AND VOICE PATTERN MATCHING

BACKGROUND

When a meeting is held in a conference room, a number of participants may not be able to attend. Collaborative workspaces are inter-connected environments in which participants in dispersed locations can interact with participants in the conference room. Improvements in processing capabilities and the widespread availability of high speed internet allow for synchronous communications between the participants at the various locations.

BRIEF DESCRIPTION OF THE DRAWINGS

FIG. 2 is a block diagram depicting an example of components of a computing device;

FIG. 3 is a block diagram depicting a memory resource and a processing resource, according to one example.

DETAILED DESCRIPTION

Examples of synchronous communications include, but are not limited to, voice and video services. As an example, the conference room may include cameras that transmit video images from that location to the other locations, for example, where the remote participants reside. Similarly, the dispersed locations may include cameras that transmit video images to the other locations. As a result, the participants at the various locations may be able to have a face to face conversation with participants in the conference room, as if they were themselves in the conference room. Similarly, the conference room and the dispersed locations may include microphones to transmit audio between the locations. Each location may include any number of cameras and microphones, for example, based on the size of the room at the location or the number of participants at the location. With regards to voice services, as various participants in the conference room may speak at the same time, and as participants may move around in the conference room, issues may arise where participants remote from the conference room may have difficulty hearing a particular participant speaking in the conference room.

Examples disclosed herein provide the ability for remote participants in a collaborative workspace to hear specified participants in a conference room, irrespective of the movement of the participants within the conference room or conversations from other participants in the conference room. As an example, the system disclosed herein may identify when the participants specified by a remote participant speaks, and automatically locate and track movements of the specified participants within the conference room. As will be further described, by tracking the movements of the identified participants within the conference room, microphones near the participants may be adjusted according to the preferences set by the remote participant.

Figure 1A:
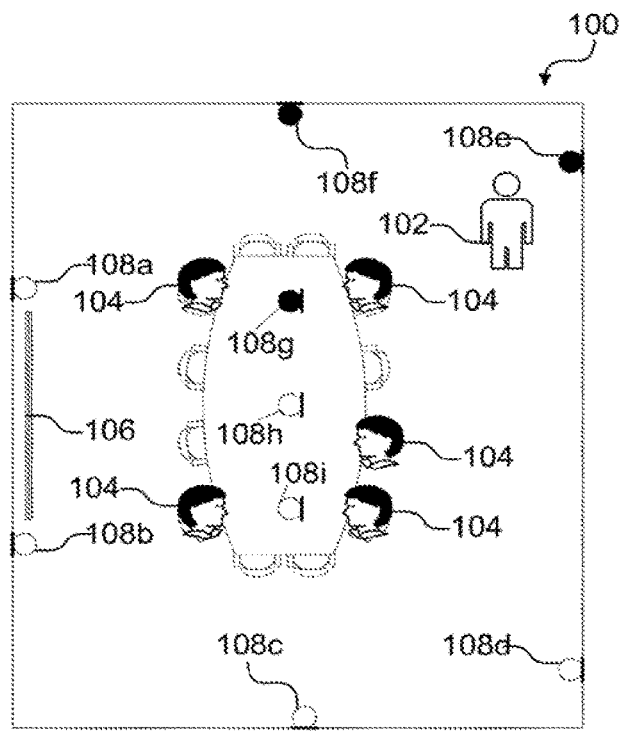
FIGS. 1A-1B illustrate participants in a conference room containing a number of microphones distributed about the perimeter of the conference room, according to an example.
Figure 1B:
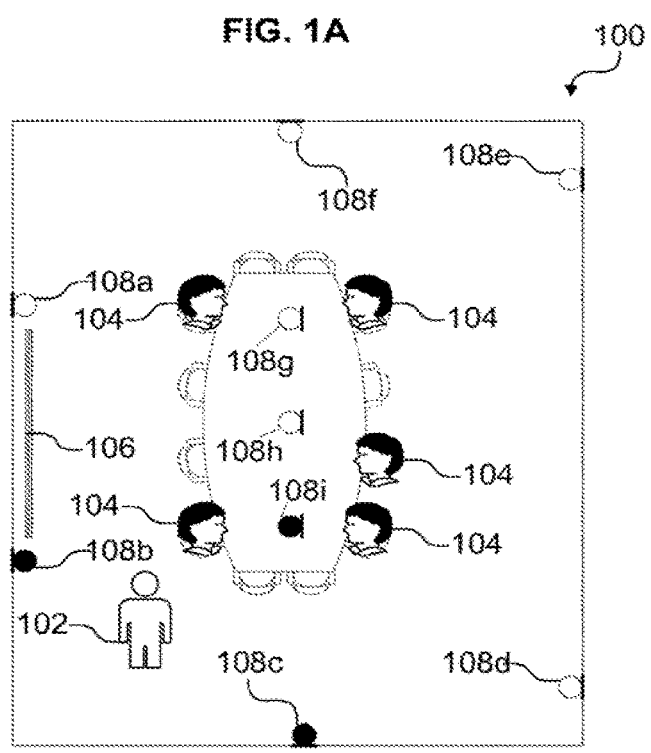

With reference to the figures, FIGS. 1A-1B illustrate participants in a conference room 100 containing a number of microphones 108a-108i distributed about the perimeter of the conference room 100, according to an example. The microphones 108a-108i may belong to at least one microphone array that operates the microphones in tandem. Examples of the microphones 108a-108i include omnidirectional microphones, directional microphones, or a mix of omnidirectional and directional microphones distributed about the perimeter. As an example, the microphones 108a-108i may be linked to a computing device that receives feeds from the microphones 108a-108i and interprets the results into a coherent form (e.g., see FIG. 2). The arrangement and number of the microphones 108a-108i in the conference room 100 are not limited to what is illustrated. In order to locate and track movements of specified participants in the conference room 100, the microphones 108a-108i may be fixed, so the location of each microphone may be known.

As mentioned above, collaborative workspaces make it possible for remote participants in dispersed locations to interact with participants in the conference room 100. As will be further described, voice pattern matching and acoustic source localization may be used in combination to provide advanced audio controls to the remote participants, in order to control the audio of specified participants in the conference room 100.

Referring to FIGS. 1A-B, the participants in the conference room 100 include participants 104 gathered around a conference table and participants 102 that may move around in the conference room 100. For example, referring to FIG. 1B, the participant 102 may move to a presentation screen or board 106 to present materials. If a remote participant desires to follow the conversation of participant 102 as the participant 102 moves around the conference room 100, microphones 108a-108i may be dynamically adjusted based on the location of the participant 102, as will be further described.

As multiple conversations may occur simultaneously in the conference room 100 (e.g., side conversations), or as multiple participants in the conference room 100 may speak on top of each other, in order to determine when a participant in the conference room 100 specified by a remote participant is speaking, voice pattern matching capabilities may be utilized. For example, the computing device linked to the microphones 108a-108i may receive feeds from the microphones 108a-108i, and extract voices from the feeds in order to perform voice pattern matching to identify the participant of each voice. As an example, voice pattern matching may include comparing the extracted voice to pre-recorded voice patterns for individuals in the conference room 100. However, when pre-recorded voice patterns may not be available, the extracted voices may be compared to recently sampled voices, as will be further described.

Voice pattern matching for identifying a speaker generally includes the steps of voice recording, feature extraction, pattern matching, and a decision. Although text dependent and text independent speaker recognition are available, text independent recognition may be desirable, where recognition is based on whatever words a participant in the conference room 100 is saying. With regards to feature extraction, where the voice recording may be cut into windows of equal length (e.g., frames), the features that may be analyzed include, but are not limited to, the frequency of the voice, as well as attributes such as dynamics, pitch, duration, and loudness of the voice.

With regards to pattern matching, the extracted frames may be compared against known speaker models/templates, resulting in a matching score that may quantify the similarity in between the voice recording and the known speaker model. The known speaker models may correspond to pre-recorded voice patterns for the participants in the conference room 100. However, when pre-recorded voice patterns are not available, dynamic sampling may be available. For example, the computing device linked to the microphones 108a-108i may dynamically sample voices of individuals in the conference room 100 to capture voice patterns, and the voice patterns may be mapped to the participants in the room 100. As a result, this mapping of the captured voice patterns may be used to compare against later extracted voices.

Upon identifying a specified individual in the conference room 100 associated with a voice detected by the microphones 108a-108i (e.g., via voice pattern matching described above), the location of the individual in the conference room 100 may be determined via acoustic source localization. As an example, acoustic source localization involves the task of locating the sound source, given measurements of the sound field collected by the microphones 108a-108i that are in fixed locations within the conference room 100. As an example, the sound field can be described using physical quantities like sound pressure and particle velocity. By measuring these properties, it is (indirectly) possible to obtain a source direction. Given the measurements of the sound field collected by the fixed microphones 108a-108i, the intensity of the voice detected individually by the microphones 108a-108i may help determine the location of participant in the conference room 100 that is specified by the remote participant. Upon determining the location of the identified participant in the conference room 100, microphones near the individual may be adjusted, according to preferences set by the remote participant.

Referring to FIG. 1A, if a participant remote from the conference room 100 desires to follow the conversation of participant 102, the voice pattern matching capabilities described above may determine when participant 102 is speaking. When it is determined that participant 102 is speaking, the location of participant 102 within the conference room 100 may be determined by acoustic source localization, as described above. For example, given the measurements of the sound field collected by the microphones 108a-108i, the intensity of the voice of participant 102 detected individually by the microphones 108a-108i may help determine the location of participant 102.

Referring to FIG. 1A, the sound pressure of the voice of participant 102 measured by microphones 108e-108g may be greater than the sound pressure measured by the other microphones in the conference room 100. As a result, participant 102 may be near microphones 108e-108g, as illustrated. Upon determining the location of participant 102 within the conference room 100, the settings of the microphones near the participant 102 may be adjusted accordingly. For example, as the remote participant desires to follow the conversation of participant 102, the gain of microphones 108e-108g may be turned up or down. Similarly, the microphones that are not near the participant 102 (e.g., microphones 108a-108d and 108h-108i) may be disabled or turned down, in order to avoid picking up any ambient noise or side conversations from other participants in the conference room 100. Although a number of microphones in the conference room 100 may be the participant 102 (e.g., microphones 108e-108g), each microphone near the participant 102 may be individually customized. For example, although microphone 108g is near participant 102, if the participants 104 near microphone 108g begin having a side conversation, microphone 108g may then be disabled or turned down, so that the remote participant continues to clearly hear participant 102.

Referring to FIG. 1B, as participant 102 moves around within conference room 100, the intensity of the voice of participant 102 detected individually by microphones 108a-108i may change, indicating movement of the participant 102 within the conference room 100. As a result, microphones 108a-108i may be dynamically adjusted so that the remote participant continues to be able to clearly hear participant 102. For example, microphones that were previously not near the participant 102 and were turned down or disabled, may be reenabled or adjusted accordingly.

Upon confirming that participant 102 is speaking (e.g., via voice pattern matching), the location of participant 102 within the conference room 100 may be determined by acoustic source localization, as described above. As an example, the sound pressure of the voice of participant 102 measured by microphones 108b-108c and 108i may be greater than the sound pressure measured by the other microphones in the conference room 100. As a result, participant 102 may be near microphones 108b-108c and 108i, as illustrated. Therefore, the settings of microphones 108b-108c and 108i may be adjusted accordingly, as described above (e.g., gain turned up or down). Similarly, the microphones that are not near the participant 102 (e.g., microphones 108a and 108d-108h) may be disabled or turned down, in order to avoid picking up any ambient noise or side conversations from other participants in the conference room 100.

FIGS. 2-3 depict examples of physical and logical components for implementing various examples. In FIG. 2, various components are identified as engines 202-208. In describing engines 202-208, focus is on each engine's designated function. However, the term engine, as used herein, refers to a combination of hardware and programming configured to perform a designated function. As is illustrated later with respect to FIG. 3, the hardware of each engine, for example, may include one or both of a processor and a memory device, while the programming contains machine instruction (e.g., code) stored on that memory device and executable by the processor to perform the designated function. The programming can include an operating system and application. In addition, the hardware of each engine can include a display and any user input buttons.

FIG. 2 is a block diagram depicting components of a computing device 200, as an example. The microphones 108a-108i may be linked to the computing device 200, and the device 200 may receive feeds from the microphones 108a-108i and interpret the results into a coherent form, as described above. In this example, the computing device 200 includes a receive engine 202, extract engine 203, perform engine 206, and determine engine 208. Receive engine 202 represents a combination of hardware and programming configured to receive audio feeds from microphones 108a-108i. As mentioned above, the microphones 108a-108i may belong to at least one microphone array that operates the microphones in tandem. As a result, the feeds received from the microphones may be synchronous in nature.

Extract engine 204 represents a combination of hardware and programming configured to extract voices from the feeds in order to perform voice pattern matching to identify the participant of each voice. As an example, the extracted voice may be cut into frames, and features extracted from the voice include, but are not limited to, the frequency of the voice, as well as attributes such as dynamics, pitch, duration, and loudness of the voice.

Perform engine 206 represents a combination of hardware and programming configured to perform voice pattern matching to identify a participant in the conference room 100 associated with the extracted voice. As an example, the computing device 200 may identify a participant in the conference room 100 that is specified by a remote participant. As an example, the extracted frames may be compared against known speaker models/templates, resulting in a matching score that may quantify the similarity in between the voice recording and the known speaker model. The known speaker models may correspond to pre-recorded voice patterns for the participants in the conference room 100. However, when pre-recorded voice patterns are not available, dynamic sampling may be available. For example, the computing device 200 may dynamically sample voices of individuals in the conference room 100 to capture voice patterns, and the voice patterns may be mapped to the participants in the room 100. As a result, this mapping of the captured voice patterns may be used to compare against the extracted voice.

Upon identifying the specified individual via voice pattern matching, determine engine 208 represents a combination of hardware and programming configured to determine the location of the identified individual in the conference room 100. As an example, the location of the identified individual may be determined via acoustic source localization. Acoustic source localization involves the task of locating the sound source, given measurements of the sound field collected by the microphones 108a-108i that are in fixed locations within the conference room 100. Given the measurements of the sound field collected by the fixed microphones 108a-108i, the intensity of the voice detected individually by the microphones 108a-108i may help determine the location of participant in the conference room 100 that is specified by the remote participant.

In the foregoing discussion, engines 202-208 were described as combinations of hardware and programming. Engines 202-208 may be implemented in a number of fashions. Referring to FIG. 3, the programming may be processor executable instructions stored on a tangible memory device 312 and the hardware may include processor 310 for executing those instructions. Thus, memory device 312 can be said to store program instructions that, when executed by processor 310, implement the components of the computing device 200 of FIG. 2. As an example, the computing device 200 may include a storage device 308 for storing the pre-recorded voice patterns for individuals in the conference room 100, as described above. In addition, the storage device 308 may be used for storing recently sampled voices from other participants in the conference room 100.

Memory device 312 represents generally any number of memory components capable of storing instructions that can be executed by processor 310. Memory device 312 is non-transitory in the sense that it does not encompass a transitory signal but instead is made up of at least one memory component configured to store the relevant instructions. As a result, the memory device 312 may be a non-transitory computer-readable storage medium. Memory device 312 may be implemented in a single device or distributed across devices. Likewise, processor 310 represents any number of processors capable of executing instructions stored by memory device 312. Processor 310 may be integrated in a single device or distributed across devices. Further, memory device 312 may be fully or partially integrated in the same device as processor 310, or it may be separate but accessible to that device and processor 310.

In one example, the program instructions can be part of an installation package that when installed can be executed by processor 310 to implement the components of the computing device 200 of FIG. 2. In this case, memory device 312 may be a portable medium such as a CD, DVD, or flash drive or a memory maintained by a server from which the installation package can be downloaded and installed. In another example, the program instructions may be part of an application or applications already installed. Here, memory device 312 can include integrated memory such as a hard drive, solid state drive, or the like.

In FIG. 3, the executable program instructions stored in memory device 312 include instructions to extract 313, instructions to perform 314, instructions to determine 315, instructions to detect 316, and instructions to adjust 317. Instructions to extract 313 represents program instructions that when executed cause processor 310 to implement extract engine 204 of FIG. 2. Instructions to perform 314 represents program instructions that when executed cause processor 310 to implement perform engine 206 of FIG. 2. Instructions to determine 315 represents program instructions that when executed cause processor 310 to implement determine engine 208 of FIG. 2. Instructions to detect 316 represents program instructions that when executed cause processor 310 to detect movements of the individual specified by the remote participant, as described above. For example, as the specified individual moves around within conference room 100, the intensity of the voice of the specified individual detected individually by microphones 108a-108i may change, indicating movement of the specified individual within the conference room 100. Instructions to adjust 317 represents program instructions that when executed cause processor 310 to dynamically adjust settings of the microphones near the specified individual, particularly as the individual moves around within the conference room 100.

Figure 4:
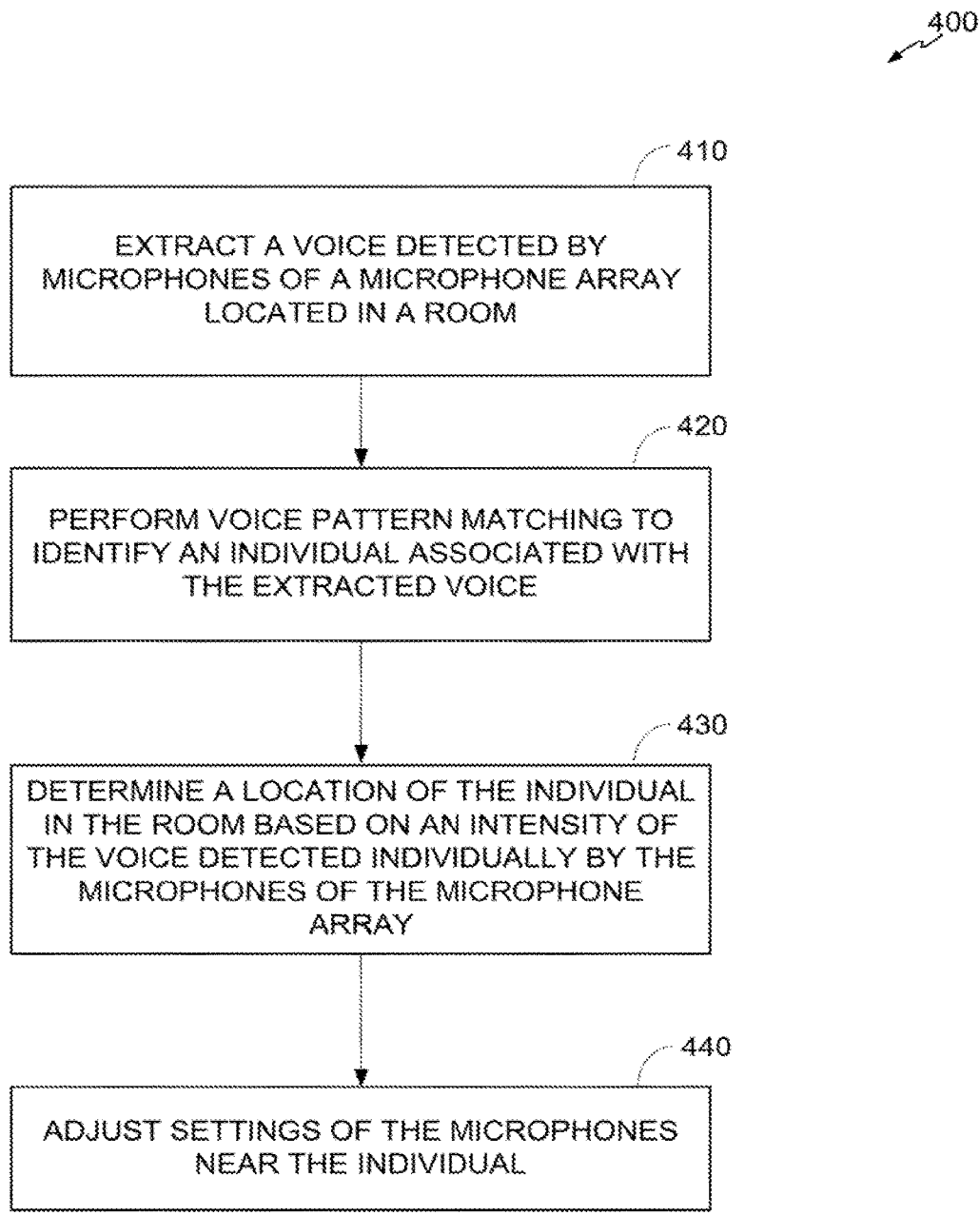
FIG. 4 is a flow diagram in accordance with an example of the present disclosure.

FIG. 4 is a flow diagram 400 of steps taken to implement a method for a computing device to identify the location of an individual within a room by using a combination of microphone arrays and voice pattern matching. In discussing FIG. 4, reference may be made to the example scenarios illustrated in FIGS. 1A-B and the components depicted in FIGS. 2-3. Such reference is made to provide contextual examples and not to limit the manner in which the method depicted by FIG. 4 may be implemented.

At 410, a computing device may extract a voice detected by microphones of a microphone array located in a room. As an example, the extracted voice may be cut into frames, and features extracted from the voice include, but are not limited to, the frequency of the voice, as well as attributes such as dynamics, pitch, duration, and loudness of the voice.

At 420, the computing device may perform voice pattern matching to identify an individual associated with the extracted voice. As an example, voice pattern matching may include comparing the extracted voice to pre-recorded voice patterns for individuals in the room. However, when pre-recorded voice patterns may not be available, the computing device may continually sample voices of individuals in the room to capture voice patterns and map the voice patterns to the individuals in the room, in order to have mapped voice patterns available for the individuals in the room.

At 430, the computing device may determine a location of the individual in the room based on an intensity of the voice detected individually by the microphones of the microphone array. As an example, the location of the identified individual may be determined via acoustic source localization. Acoustic source localization involves the task of locating the sound source, given measurements of the sound field collected by the microphones 108a-108i that are in fixed locations within the conference room 100. Given the measurements of the sound field collected by the fixed microphones 108a-108i, the intensity of the voice detected individually by the microphones 108a-108i may help determine the location of participant in the conference room 100 that is specified by the remote participant.

At 440, the computing device may adjust settings of the microphones near the individual. As an example, adjusting the settings of the microphones near the individual generally includes turning up or down a gain of the microphones. Similarly, the computing device may disable microphones of the microphone array that are not near the individual. As the individual may move around in the room, the computing device may detect movement of the individual within the room when the intensity of the voice detected individually by the microphones of the microphone array changes. Upon detecting movement of the individual to a microphone that was previously turned down or disabled, the computing device may reenable the microphone, or adjust accordingly.

Although the flow diagram of FIG. 4 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method comprising:
   receiving a selection of an individual to follow in a room from a remote participant;
   extracting voices detected by microphones of a microphone array located in the room;
   performing voice pattern matching to identify the individual associated with a voice from the extracted voices;
   determining a location of the individual in the room based on an intensity of the voice detected individually by the microphones of the microphone array;
   detecting, by a microphone of a subset of the microphones near the individual at the location, other voices from the extracted voices that are not associated with the individual; and
   adjusting settings of the microphone of the subset of microphones near the individual in response to the detecting, wherein adjusting the settings comprises turning down a gain of the microphone of the subset of the microphones near the individual.

2. The method of claim 1, comprising:
   disabling microphones of the microphone array that are not near the individual.

3. The method of claim 1, comprising:
   detecting movement of the individual within the room when the intensity of the voice detected individually by the microphones of the microphone array changes.

4. The method of claim 1, comprising:
   reenabling a microphone of the microphone array when the individual is near the microphone.

5. The method of claim 1, wherein performing the voice pattern matching comprises comparing the voice from the extracted voices to pre-recorded voice patterns for individuals.

6. The method of claim 1, wherein performing the voice pattern matching comprises:
   dynamically sampling voices of individuals in the room to capture voice patterns;
   mapping the voice patterns to the individuals in the room; and
   comparing the voice from the extracted voices to the captured voice patterns.

7. A system comprising:
   microphone arrays located in a room; and
   a computing device comprising a processor to execute instructions to:
      receive a selection of an individual to follow in the room from a remote participant;
      receive feeds of audio from microphones of the microphone arrays;
      extract voices from the feeds;
      perform voice pattern matching for identifying the individual associated with a voice from the extracted voices;
      determine a location of the individual in the room based on an intensity of the voice detected individually by the microphones of the microphone arrays;
      detect, by a microphone of a subset of the microphones near the individual at the location, other voices from the extracted voices that are not associated with the individual; and
      adjust settings of the microphone of the subset of microphones near the individual in response to the other voices that are detected, wherein adjusting the settings comprises turning down a gain of the microphone of the subset of the microphones near the individual.

8. The system of claim 7, wherein the processor executes instructions to detect movement of the individual within the room when the intensity of the voice detected individually by the microphones of the microphone array changes.

9. The system of claim 7, wherein the processor executes instructions to perform the voice pattern matching comprises comparing the extracted voices to pre-recorded voice patterns for individuals.

10. The system of claim 7, wherein the processor executes instructions to perform the voice pattern matching, comprising instructions to comprises:

dynamically sample voices of individuals in the room to capture voice patterns;

map the voice patterns to the individuals in the room; and compare the voice from the extracted voices to the captured voice patterns.

11. A non-transitory computer-readable storage medium comprising programming instructions which, when executed by a processor, to cause the processor to:

receive a selection of an individual to follow in the room from a remote participant;

extract voices detected by microphones of a microphone array located in a room;

perform voice pattern matching to identify the individual associated with a voice from the extracted voices;

determine a location of the individual in the room based on an intensity of the voice detected individually by the microphones of the microphone array;

detect movement of the individual within the room when the intensity of the voice detected individually by the microphones of the microphone array changes;

detect, by a microphone of a subset of the microphones near the individual at the location, other voices from the extracted voices that are not associated with the individual; and dynamically adjust settings of the microphone of the subset of microphones near the individual in response to the other voices that are detected, wherein the instructions to adjust settings comprises instructions to turn down a gain of the microphone of the subset of the microphones near the individual.

12. The non-transitory computer-readable storage medium of claim 11, wherein the instructions to perform the voice pattern matching comprises instructions to compare the extracted voices to pre-recorded voice patterns for individuals.

13. The non-transitory computer-readable storage medium of claim 11, wherein the instructions to perform the voice pattern matching comprises instructions to:

dynamically sample voices of individuals in the room to capture voice patterns;

map the voice patterns to the individuals in the room; and compare the voice from the extracted voices to the captured voice patterns.

* * * * *